(No Model.)

R. A. GIBSON.
VEHICLE WHEEL RIM.

No. 528,666. Patented Nov. 6, 1894.

Witnesses.
J. M. Caldwell.
A. J. Sangster.

Robert A. Gibson, Inventor.
By James Sangster
Attorney.

UNITED STATES PATENT OFFICE.

ROBERT A. GIBSON, OF BUFFALO, NEW YORK.

VEHICLE-WHEEL RIM.

SPECIFICATION forming part of Letters Patent No. 528,666, dated November 6, 1894.

Application filed December 4, 1893. Serial No. 492,718. (No model.)

*To all whom it may concern:*

Be it known that I, ROBERT A. GIBSON, a citizen of the United States, residing in Buffalo, in the county of Erie and State of New York, have invented certain new and useful Improvements in Vehicle-Wheel Rims, of which the following is a specification.

My invention relates to certain improvements whereby the strength and durability of the rim of a bicycle or other wheel is greatly increased, all of which will be fully and clearly hereinafter described and claimed, reference being had to the accompanying drawings, in which—

Figure 1:
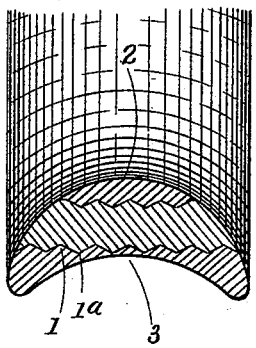
Figure 2:
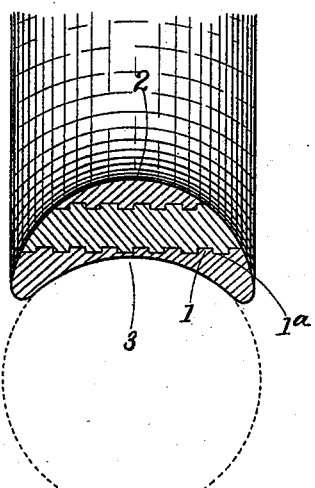
Figure 3:
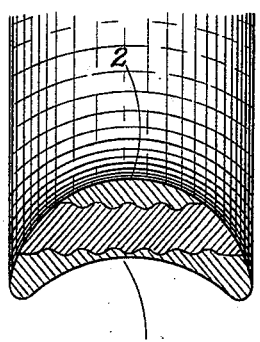
Figure 4:
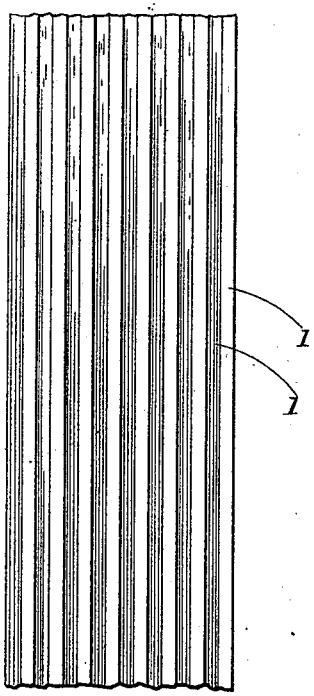
Figure 5:
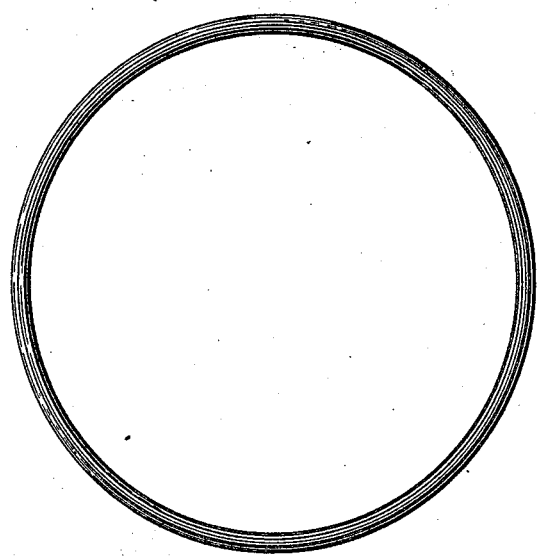

Figure 1, is a cross section through a portion of a rim of a wheel made in accordance with my invention, showing a series of grooves where the strips composing the rim are glued or connected together. Fig. 2, is a similar view, showing the preferred form of longitudinal alternate tongues and grooves in the strip where they meet and are secured together. Fig. 3, also represents a cross section through a portion of a rim, showing a modification in the transverse shape of the grooves and tongues. Fig. 4, represents a face view of a portion of one of the strips composing a rim, showing a similar view of the longitudinal tongues and grooves therein. Fig. 5, represents a side elevation of a completed rim.

It is well known that a solid wooden rim made in one piece and secured together at the ends, however carefully it may be constructed, is liable to warp and get out of shape and thereby become useless in a short time. It is also well known that this objection may be avoided by making the rim of a series of strips or layers glued together, but there is another very serious objection with a construction of this kind, that is, the strips composing the rim are liable to come apart or separate where they are joined together and are soon rendered useless.

The object of my invention is to avoid this objection by making longitudinal tongues and grooves 1 and $1^a$, in the faces of the strips so that they will interlock with each other when they are put together and glued, substantially as shown in Fig. 2 where the strongest form is shown when secured together.

The grooves and tongues on one strip correspond exactly with the grooves and tongues on the other strip, so that they will all interlock and fit exactly when put together with glue as above mentioned. These strips are then glued together and formed into a rim, substantially as shown in Fig. 5.

I have described a series of tongues and grooves but a single tongue and groove may be used if desired. The rim I have shown, is made with the convex portion 2, on its inner side, and its outer face 3, is made concave so as to receive an elastic or rubber tire, thereby adapting it for a bicycle wheel. This construction renders the rim stronger and more durable than one made out of a single strip, and has none of the objections that are usually connected with a rim made either in one piece or a series of layers of the usual form as heretofore made and glued together.

I claim as my invention—

A vehicle wheel rim, consisting of a series of strips of wood, each strip having a parallel series of longitudinal tongues and grooves on its face so that when forced together and glued, the tongues and grooves alternately interlock with each other and form a solid vehicle wheel rim, the several layers of which are rigidly secured together by glue and the interlocking tongues and grooves substantially as described.

ROBERT A. GIBSON.

Witnesses:
JAMES SANGSTER,
J. M. CALDWELL.